Oct. 23, 1956     I. SCHWARTZ ET AL     2,767,701
AIR ACTUATED SPEAR GUN

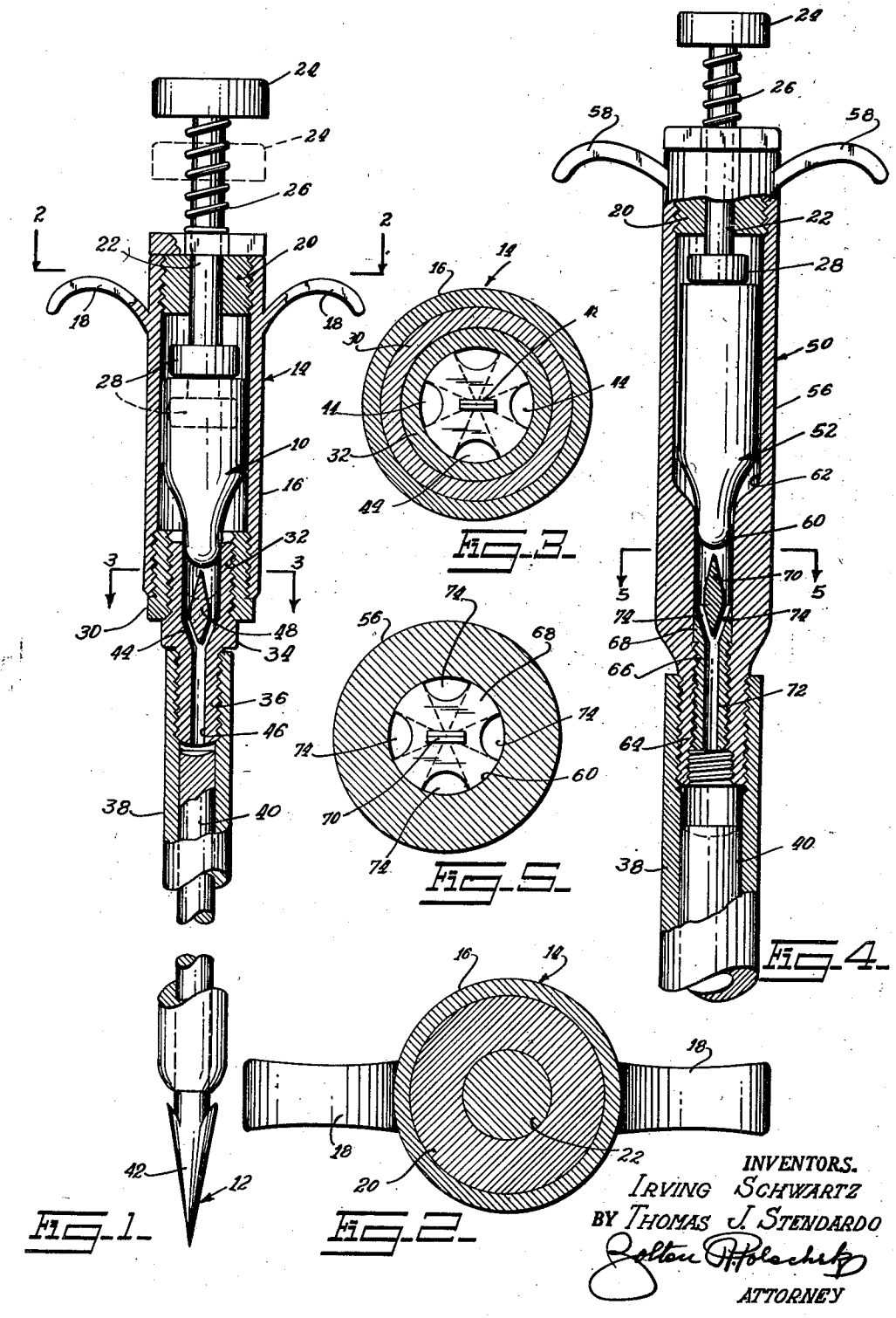

Filed Feb. 12, 1954     2 Sheets-Sheet 2

INVENTORS.
IRVING SCHWARTZ
BY THOMAS J. STENDARDO

ATTORNEY 2,767,701
Patented Oct. 23, 1956

2,767,701

AIR ACTUATED SPEAR GUN

Irving Schwartz and Thomas J. Stendardo, Brooklyn, N. Y.

Application February 12, 1954, Serial No. 409,898

1 Claim. (Cl. 124—11)

This invention relates to a spear gun, such as may be used to advantage in the aquatic sport known as spear fishing.

Heretofore, spear fishing has generally involved the use of manually thrown spears, and it will be readily appreciated that it is quite difficult, under these circumstances, to insure accurate direction of the spear toward its target. Further, the motions involved in aiming and throwing the spear tend, in many instances, to frighten the fish that is being stalked by the spear fisherman underwater, or, for that matter, from above the surface.

The main object of the present invention, in view of the above, is to provide a spear gun that will represent an improvement, generally speaking, over the spear fishing equipment now in use.

A further object of importance is to equip a gun of the nature referred to with a cartridge containing a supply of compressed air. By reason of this arrangement, it is proposed to provide the gun with a spear-actuating means that will be quiet, sure, and smooth in operation, thus to direct the spear swiftly and quietly to its target without alarming other fish in the vicinity.

Another object is to so design the spear gun as to permit the cartridge to be punctured by depression of a plunger projecting as an axial extension from the cartridge barrel of the weapon, the depression of the plunger being effected without disturbing the aim previously taken on the target, and without disturbing the target itself.

Yet another object is to cause the cartridge to be punctured, and the compressed air released therefrom, responsive to shifting of the cartridge against a stationary prong within the cartridge barrel by depression of the plunger.

Another object is to form a gun of the type stated from readily detachable parts, capable of manufacture at low cost, and easily assembled or disassembled for cleaning, reloading, or maintenance.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a longitudinal sectional view, portions being broken away, of a spear gun formed in accordance with the present invention, the dotted lines showing the position of the parts when the gun is being fired.

Fig. 2 is an enlarged transverse sectional view on line 2—2 of Fig. 1.

Fig. 3 is a sectional view on line 3—3 of Fig. 1.

Fig. 4 is a view similar to Fig. 1 showing a modified form.

Fig. 5 is an enlarged transverse sectional view on line 5—5 of Fig. 4.

Figure 6:
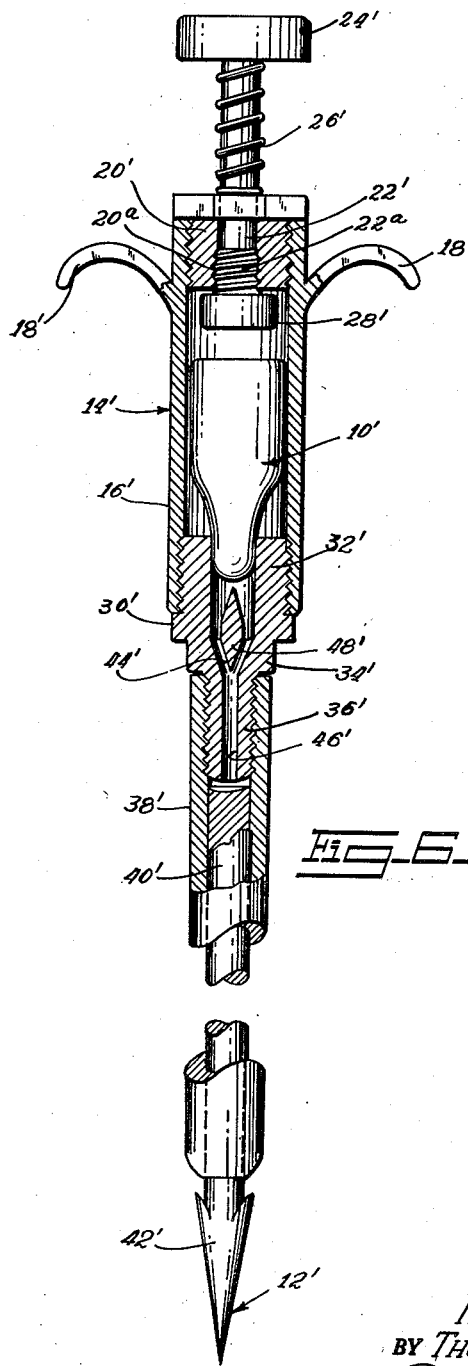
Fig. 6 is another view similar to Fig. 1, showing another modification.

In the form of the invention shown in Figs. 1-3, the reference numeral 10 has been applied generally to a cartridge of cylindrical form in which is held a supply of compressed air. A spear has been generally designated 12, said spear and cartridge being carried within a spear gun 14 formed in accordance with the present invention.

The gun 14 includes, at one end, a cylindrical, relatively short cartridge barrel 16 of constant internal and external diameter from end to end, and having open, interiorly threaded ends. Adjacent one end, the barrel 16 is formed with integral, diametrically opposed finger grips 18 projecting radially and outwardly from the barrel and formed arcuately to insure accurate placement of the fingers and to prevent slippage of the fingers when in use. The grips can be otherwise formed, it is believed, or might be eliminated entirely in some forms of the invention, it being mainly important that if used, they are to be disposed where they will aid in proper positioning of the user's thumb upon the plunger button.

A cap 20 is threaded into the outer end of the barrel 16, and may be formed as shown with a wrench-receiving portion to facilitate its being tightened in place. An axial bore is formed in the cap, and slidably mounted in said bore is a plunger stem 22 having an outer end projecting axially of and beyond the barrel 16 and provided with a button 24. A coil spring 26 is circumposed about the stem between button 24 and cap 20, and normally urges the plunger stem outwardly of the barrel to the full line position shown in Fig. 1.

At its inner end, the plunger stem is formed with a head 28 adapted to engage one end of cartridge 10, so as to shift the cartridge longitudinally of the barrel responsive to depression of the plunger.

In the other end of the barrel, there is threaded a nipple 30, having internal threads for engagement therein of an externally threaded sleeve 32. Sleeve 32 is formed at one end with a wrench-receiving portion 34 integrally provided with an axial extension 36 threaded to engage internal threads formed in the adjacent end of an elongated spear tube 38 in which is slidably housed the shank 40 of spear 12. The shank has one end projecting out of the tube and formed with a barbed point 42.

In the portion 34, there are formed circumferentially spaced branch passages 44 opening at one end into communication with the interior of the barrel 16, and converging in a direction away from the barrel to extend into communication with an axial main passage 46 of the extension 36, which passage 46 opens into the spear tube 38.

A prong 48, preferably formed with a flattened, triangular head and with a narrower shank, is extended axially of and within the sleeve 32 and is integral or otherwise rigid with the portion 34, the divergent ends of the branch passages being spaced uniformly about the prong as best shown in Fig. 3.

In use of the device shown in Fig. 1, one first removes cap 20 and inserts a cartridge 10 formed as a cylinder in which is sealed a suitable supply of compressed air or other expandable pressure fluid. The cylinder used has a wall of a material sufficiently soft to permit the cylinder to be punctured readily by the prong when the plunger is depressed. Further, the cylinder preferably is tapered or slightly rounded at its ends, as shown.

The gun is now ready for use, after replacement of cap 20. When a fish has been located, the user takes aim, holding the tube in one hand, and positioning the thumb of his other hand against the button 24, with the index and middle fingers engaged under grips 18.

In firing the gun, one simply depresses the button 24 slowly, against the restraint of spring 26, until the cartridge 10 has been impaled upon the prong 48. As soon as the cartridge has been shifted past the triangular portion of the prong, the air held under compression therein will be permitted to expand out of the opening formed by perforation of the cartridge. Said air will then pass through the passages 44 and passage 46 to exert pressure against the inner end of the spear, thus forcing the spear under heavy pressure and at substantial speed out of the spear tube toward the fish or other target at which it was aimed.

In Figs. 4 and 5, there is shown a modified form in which the cartridge barrel 50 is of one piece formation, thus facilitating manufacturing operations and simplifying assembly and disassembly during normal use of the device. A cartridge 52 is slidably mounted in the barrel, and like cartridge 10, has sealed therein a supply of compressed air.

The barrel includes a cylindrical body 56 formed at one end with diametrically opposed finger grips 58. At its other end, the barrel has an axial bore 60 merging into a counterbore 62.

That end of the barrel remote from grips 58 is exteriorly reduced in diameter and externally threaded as at 64. In this end, there is mounted a prong assembly including a cylindrical, externally threaded part 66 and a head 68 of slightly greater diameter than said part 66. The bore 60, at its outer end, is threaded to receive the part 66.

Formed upon the head 68 is a centrally disposed prong 70 similar to prong 48. An axial bore 72 of part 66 communicates between the interior of tube 38 and a series of convergent branch passages 74 that open into the body of the barrel.

This construction simplifies the gun manufacture by elimination of the nipple or adaptor 30, and by connection of tube 38 directly to the cartridge barrel. In use, of course, the device is loaded and fired in the same manner as the first form.

In Fig. 6 the nipple 30' is made integral with the threaded sleeve 32' and the axial extension 36' of the wrench-receiving portion 34'.

The plunger-stem 22' is shown to be threaded at 22ª adjacent to head 28' so that the threaded portion 22ª of the plunger-stem 22' may be screwed into a complementary threaded portion 20ª formed in the cap 20'. With this arrangement the plunger may be locked, when not in use.

In other respects this form of the invention is similar to the preferred form of the invention and similar parts may be recognized by corresponding reference numerals with a prime added. While we have illustrated and described the preferred embodiments of our invention, it is to be understood that we do not limit ourselves to the precise constructions herein disclosed and the right is reserved to all changes and modifications coming within the scope of the invention as defined in the appended claim.

Having thus described our invention, what we claim as new, and desire to secure by United States Letters Patent is:

A spear gun comprising a tubular barrel internally threaded at both ends thereof, opposed finger grips radially extending from one end thereof, a threaded cap plugged in one end of the barrel, said cap having a central bore, a thimble threaded into the opposite end of the barrel, said thimble having internal threads, an externally threaded sleeve threaded into said thimble and protruding outwardly thereof, said sleeve having an enlarged passage at one end and a restricted passage at its other end, a tube threaded onto the protruding end of the sleeve, a shanked and headed spear slidably mounted in said tube with its head protruding outwardly of the outer end of the tube, a spring-pressed plunger slidable through the bore in the cap and extending into the interior of the tubular barrel, a head on the inner end of said plunger, a button on the outer end thereof, a spring encircling the plunger between the button and cap, a rupturable cartridge containing compressed air in said tubular barrel between the plunger head and sleeve, and a prong on the inner surface of the sleeve in the path of movement of the cartridge for rupturing said cartridge and dividing the escaping gas into two branches leading to the restricted passage in the sleeve, said button being disposed between said finger grips and within reach of the other fingers of the gripping hand.

References Cited in the file of this patent

UNITED STATES PATENTS

| | | |
|---|---|---|
| 1,187,193 | Smith | June 13, 1916 |
| 1,542,159 | Maxwell | June 26, 1925 |
| 2,375,314 | Mills | May 8, 1945 |
| 2,504,525 | Holderness | Apr. 18, 1950 |
| 2,660,993 | Blakeslee | Dec. 1, 1953 |

FOREIGN PATENTS

| | | |
|---|---|---|
| 1,020,589 | France | Nov. 19, 1952 |